July 7, 1959 C. ACHTZIGER 2,893,583

SOUP CUP

Filed June 2, 1954

INVENTOR.
CHRISTOPH ACHTZIGER.
BY Paul M. Craig, Jr.
ATTORNEY

United States Patent Office 2,893,583
Patented July 7, 1959

2,893,583
SOUP CUP

Christoph Achtziger, Weiden, Oberpfalz, Germany, assignor to Porzellanfabrik Weiden Gebr. Bauscher, Zweigniederlassung der Lorenz Hutschenreuther Aktiengesellschaft, Selb, Weiden, Oberpfalz, Bavaria, Germany, a firm Application June 2, 1954, Serial No. 434,042

Claims priority, application Germany June 16, 1953

3 Claims. (Cl. 215—10)

The invention relates to a soup cup, the handles of which are so shaped and arranged that several similar cups can be built up one upon the other and form a stable pile.

The ordinary soup cups are mostly so-called bowl cups, that is, the body is approximately of spherical dome shape towards the crimp of the foot or base. Such cups cannot, however, be piled if the handles are constructed and arranged in the usual manner. The fitting of eye-shaped handles is likewise not a satisfactory solution because such handles do not afford a firm resting surface for the rim of the lower cup. The piling of bowl-shaped soup cups was hitherto not possible at all.

By the invention a soup cup is produced which—without departing from the ordinary shape of such cups—permits secure and firm piling in horizontal position. According to the invention the two handles of the soup cup have at their lower end an extension extending on both sides of the lateral face of the cup and forming a wide bearing surface for the rim of the lower cup.

An embodiment of the invention is illustrated by way of example in the accompanying drawing, in which.

Figure 1:
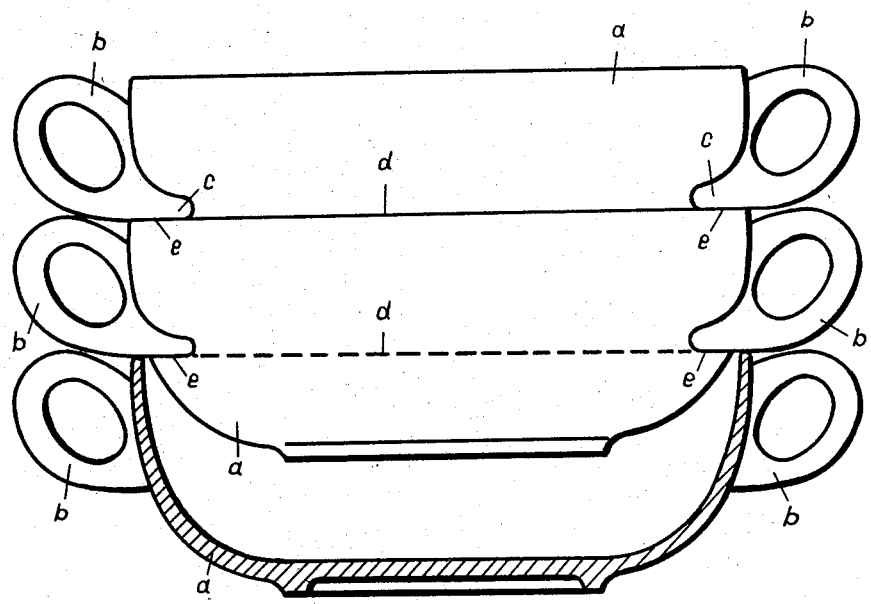
Fig. 1 is a diagrammatic view of a pile of three cups, the lowermost cup being in section.

The ceramic bowl-shaped soup cup *a* has two similar, diametrically opposite, band-shaped handles *b* arranged vertically in the usual manner and providing horizontal finger apertures. Each handle has at its lower end a short extension *c* which extends parallel to the horizontal rim *d* of the cup *a* on both sides of the handle for a distance of approximately half the width of the handle on the lateral surface of the cup *a*. The outer surface of each cup below the plane defined by the bottom bearing surface *e* of the handle and its extensions converges downwardly and is of smaller size than the inner surface of the cup adjacent the rim whereby the portion of the cup below this plane is readily received within the upper portion of a similar cup to permit piling with the only vertical support between adjacent cups being the engagement of said bearing surface with the rim of the next lower cup. This is most clearly illustrated in Figure 1 wherein the lower most cup is shown in section.

Figure 2:
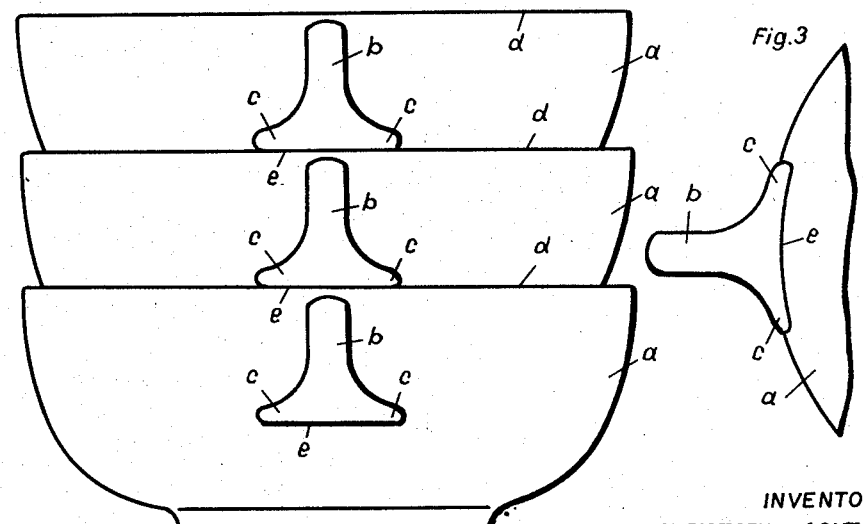
Fig. 2 shows the same pile of cups turned thru an angle of 90° relatively to Fig. 1.
Figure 3:
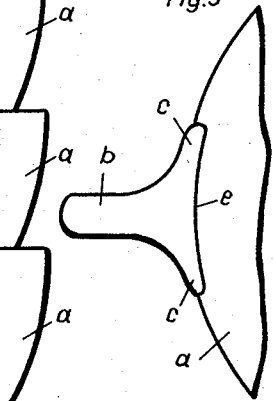
Fig. 3 is a partial bottom plan view of a handle attachment.

When the cups are piled the horizontal surface *e* of the handle extension *c* of the upper cup rests on the rim *d* of the lower cup. The surface *e*, which is about three times as wide as the handle as seen in Figure 2 and extends parallel to the rim of the cup, affords the upper cup an ample supporting surface at two diametrically opposite points and enables several similarly shaped cups to be built-up into a secure and firm pile. The length of the surface *e* as seen in Figure 2 provides stable support for the two upper cups and prevents the piled cups from toppling over sideways. A pile of cups having handles constructed according to the invention constitutes a stable unit.

The invention is applicable to soup cups of any shape. The two-sided handle extension does not detract from the general appearance of the cup; on the contrary, it has a certain decorative effect which approves the appearance of the cup. The shape of the handle according to the invention presents no difficulties in manufacture. The handles can be produced and applied in the usual manner.

I claim:

1. A ceramic bowl-shaped soup cup comprising a body having a horizontal rim and vertical band-shaped handles with horizontal finger apertures therein, said handles being made of essentially the same material as said body and being irremovably attached to said body at substantially equally spaced distances from each other, each of said handles being provided with horizontal extensions broadening the lower ends thereof along the lateral outer surface of the cup body, said handle with said extensions having a bottom surface forming a horizontal bearing surface of considerably greater length than the width of said handles for cooperation with the rim of a similar cup when a plurality of such cups are built up to form a pile, the outer surface of said cup below a plane defined by said bearing surfaces converging downwardly and being of smaller size than the inner surface of said cup adjacent the rim to permit piling of said cup upon and beneath respective similar cups in said pile with the bearing surfaces and rim of said cup engaging the rim and bearing surfaces of said respective similar cups, said bearing surfaces being of such length as to provide stable support for said cup in said pile.

2. A bowl-shaped soup cup as set forth in claim 1, wherein two of said handles with said extensions are provided located diametrically opposite each other.

3. A bowl-shaped soup cup as set forth in claim 1, wherein said length of each of said horizontal bearing surfaces is substantially three times the width of each of said handles, said width being measured in a direction normal to a vertical plane through the center of said handle and the center of said cup.

References Cited in the file of this patent

UNITED STATES PATENTS

| D. 24,332 | Fradley | May 28, 1895 |
|---|---|---|
| D. 45,138 | Heisey | Jan. 6, 1914 |
| D. 49,224 | Sanford | June 20, 1916 |
| D. 52,816 | Beiswanger | Dec. 31, 1918 |
| 649,258 | Peacock | May 8, 1900 |
| 860,741 | Fowles | July 23, 1907 |
| 939,572 | Watson | Nov. 9, 1909 |
| 1,238,092 | Blass | Aug. 28, 1917 |
| 1,492,884 | Lambrecht | May 6, 1924 |
| 1,666,389 | Mander | Apr. 17, 1928 |
| 1,729,017 | Siddall | Sept. 24, 1929 |
| 2,544,824 | Clifford | Mar. 13, 1951 |

FOREIGN PATENTS

| 28,934 | Sweden | May 28, 1910 |
|---|---|---|
| 475,005 | Germany | Apr. 16, 1929 |
| 310,461 | Switzerland | Dec. 16, 1955 |